US011164154B2

(12) United States Patent
Roberts et al.

(10) Patent No.: US 11,164,154 B2
(45) Date of Patent: Nov. 2, 2021

(54) FLEXIBLE AND PRIORITIZED MULTI-PURSE TABLES FOR MULTI-ACCOUNT BENEFIT PLAN MANAGEMENT AND PROCESSING

(71) Applicant: ConnectYourCare, LLC, Hunt Valley, MD (US)

(72) Inventors: David Roberts, Cockeysville, MD (US); Brian Strom, Baltimore, MD (US); Barbara Boudreau, Lutherville, MD (US)

(73) Assignee: ConnectYourCare, LLC, Hunt Valley, MD (US)

( * ) Notice: Subject to any disclaimer, the term of this patent is extended or adjusted under 35 U.S.C. 154(b) by 498 days.

(21) Appl. No.: 15/282,244

(22) Filed: Sep. 30, 2016

(65) Prior Publication Data

US 2017/0098193 A1 Apr. 6, 2017

Related U.S. Application Data

(60) Provisional application No. 62/236,525, filed on Oct. 2, 2015.

(51) Int. Cl.
*G06Q 10/10* (2012.01)
*G06Q 40/00* (2012.01)

(52) U.S. Cl.
CPC ......... *G06Q 10/1057* (2013.01); *G06Q 40/12* (2013.12)

(58) Field of Classification Search
CPC .................................................. G06Q 10/1057
See application file for complete search history.

(56) References Cited

U.S. PATENT DOCUMENTS 6,108,641 A * 8/2000 Kenna ................... G06Q 20/04
705/35
7,213,750 B1 5/2007 Barnes et al.
(Continued)

FOREIGN PATENT DOCUMENTS

WO WO2002095647 A2 * 11/2002

OTHER PUBLICATIONS

"Health debit card offered / Visa, Blue Cross and Blue Shield will join forces", 2005, https://www.sfgate.com/business/article/Health-debit-card-offered-Visa-Blue-Cross-and-2594243.php (Year: 2005).*
(Continued)

*Primary Examiner* — Allen C Chein
(74) *Attorney, Agent, or Firm* — Sterne, Kessler, Goldstein & Fox P.L.L.C.

(57) ABSTRACT

Disclosed herein are system, method, and computer program product embodiments for configuring a multi-purse (MP) table for representing a benefit plan including multiple accounts and respective eligible services. An embodiment operates by storing MP table configurations within a management database. Upon receiving a plan offering for an employee, an MP table selection component of the management system may select an MP table configuration from the stored MP table configurations. The MP table selection component may configure an MP table using the selected MP table configuration by enabling access indicators of respective account types of the MP table that satisfy at least one of the received plurality of accounts in the plan offering. Upon configuration of the MP table, a distribution component of the management system may send the MP configuration to a card vendor configured to process claims received at the card vendor.

20 Claims, 12 Drawing Sheets

(56) References Cited

U.S. PATENT DOCUMENTS

| | | | |
|---|---|---|---|
| 7,363,263 B1* | 4/2008 | Magaram | G06Q 20/10 705/35 |
| 7,866,548 B2* | 1/2011 | Reed | G06Q 20/04 235/380 |
| 7,905,399 B2 | 3/2011 | Barnes et al. | |
| 7,925,518 B2 | 4/2011 | Lee et al. | |
| 7,970,626 B2* | 6/2011 | Cracchiolo | G06Q 20/10 705/2 |
| 8,245,137 B2* | 8/2012 | Jones | G06F 17/30011 715/255 |
| 8,595,031 B1 | 11/2013 | Heffley et al. | |
| 2008/0281641 A1* | 11/2008 | Pilzer | G06Q 10/10 705/4 |
| 2009/0276695 A1* | 11/2009 | Hodges | G06F 40/151 715/249 |
| 2012/0054088 A1 | 3/2012 | Edrington et al. | |
| 2012/0089830 A1* | 4/2012 | Kande | G06F 21/645 713/155 |
| 2012/0253852 A1* | 10/2012 | Pourfallah | G06Q 20/3276 705/4 |
| 2013/0144783 A1 | 6/2013 | Bishop | |
| 2013/0332199 A1 | 12/2013 | Freiwat et al. | |
| 2014/0114822 A1* | 4/2014 | Sharma | G06Q 40/12 705/31 |
| 2014/0114872 A1* | 4/2014 | Morgan | G06Q 40/08 705/322 |
| 2014/0288958 A1 | 9/2014 | Hummer et al. | |
| 2015/0095186 A1 | 4/2015 | Mekala et al. | |
| 2015/0234910 A1* | 8/2015 | Schiff | G06Q 10/06 707/634 |

OTHER PUBLICATIONS

"Department of Defense Government Charge Card Guidebook for Establishing and Managing Purchase, Travel, and Fuel Card Programs", 2006, https://www.acq.osd.mil/dpap/pcard/pcardguidebook-20060120.pdf (Year: 2006).*

Declaration of Melissa Stirling relating to U.S. Pat. No. 10,032,217, filed in Supplemental Examination Control No. 96/000,321 on Apr. 9, 2020; 12 pages.

Supplemental Declaration of Melissa Stirling and associated exhibits relating to U.S. Pat. No. 10,032,217, filed in Supplemental Examination Control No. 96/000,321 on Nov. 2, 2020; 52 pages.

Office Action in Supplemental Examination Control No. 96/000,321, dated Aug. 31, 2020; 43 pages.

Response to Office Action in Ex Parte Reexamination, filed in Supplemental Examination Control 96/000,321 dated Nov. 2, 2020; 85 pages.

Final Office Action in Supplemental Examination Control No. 96/000,321, dated Jan. 25, 2021; 54 pages.

* cited by examiner

600

User Status Tables 602

User Accounts Status 604

| Account ID | Available Balance | Start Date | End Date | Access Indicator |
|---|---|---|---|---|
| HSA | $500 | 2015.01.01 | 9999.12.31 | ENABLE |
| FSAO | $800 | 2015.01.01 | 2016.03.15 | ENABLE |
| FSAE | $400 | 2014.01.01 | 2015.03.15 | ENABLE |
| HSAOD | $2000 | 2015.01.01 | 9999.12.31 | DISABLE |
| HRA | $600 | 2015.01.01 | 9999.12.31 | ENABLE |

User Claims Processing Sequence 608

| Order | Account ID |
|---|---|
| 01 | FSAE |
| 02 | FSAO |
| 04 | HRAE |
| 05 | HRAO |
| 07 | HSA |
| 08 | HSAOD |
| 09 | RVLOC |
|  |  |

User MP Table 606

| Account | Priority | Eligible Services | Access Indicator |
|---|---|---|---|
| FSA-L | 1 | D,V | ENABLE |
| HRA | 2 | D,V,M,P | ENABLE |
| NULL | NULL | NULL | DISABLE |
| HSA | 3 | D,V,M,P | ENABLE |
| HSAOD | 4 | D,V,M,P | DISABLE |
| FSA-G | 1 | D,V,M,P | DISABLE |

User MP Table 1102B

| Account | Priority | Eligible Services | Access Indicator |
|---|---|---|---|
| FSA | 1 | D,V | ENABLE |
| HRA | 2 | D,V | DISABLE |
| HSA | 3 | D,V,M,P | ENABLE |
| HSAOD | 4 | D,V,M,P | DISABLE |
|  |  |  |  |
|  |  |  |  |

User MP Table 1102A

| Account | Priority | Eligible Services | Access Indicator |
|---|---|---|---|
| FSA | 1 | D,V,M,P | ENABLE |
| HRA | 2 | D,V,M,P | ENABLE |
| HSA | 3 | D,V,M,P | DISABLE |
| HSAOD | 4 | D,V,M,P | DISABLE |
|  |  |  |  |
|  |  |  |  |

FIG. 11

FLEXIBLE AND PRIORITIZED MULTI-PURSE TABLES FOR MULTI-ACCOUNT BENEFIT PLAN MANAGEMENT AND PROCESSING

BACKGROUND

Contribution funded accounts and other tax-advantaged financial accounts may be set up through, for example, a cafeteria plan provided by an employer. A benefit or cafeteria plan is an employee benefit plan that allows an employee to contribute, pre-tax, some of his total income to a designated account. To provide for greater flexibility, an employer may enable an employee to select multiple accounts in his cafeteria plan. The selected plan may allow an employee to contribute a portion of his pre-tax earnings at the end of each pay period to fund one or more of the multiple accounts in the benefit plan. Each of the accounts may have associated limitations and the funds within the multiple accounts may be used to pay for qualified expenses as established in the cafeteria plan.

In traditional processing systems, a plan manager may utilize rigid and static configurations within a database to provide the multiple accounts for an employee's benefit plan. However, an employee's selection of accounts within his benefit plan and restrictions associated with those accounts may often change due to, for example, changes in options offered by the employer, employee's choices, or changes in tax or policy laws. Consequently, changes in an employee's benefit plan may often require the plan manager to design or select new configurations to provide the updated benefit plan for the employee. Re-selection or redesigning may introduce significant structural changes to the database and additional latencies for configuring the benefit plan. Moreover, an employer may want to provide a large number of benefit plan offerings including many selectable accounts and service types. To accommodate the employer, the plan manager may need to support a large number of configurations, which further complicate management of benefit plans.

BRIEF DESCRIPTION OF THE DRAWINGS

The accompanying drawings are incorporated herein and form a part of the specification.

FIG. 6 is an example block diagram illustrating a possible configuration of an employee's benefit plan, according to an example embodiment.

FIG. 11 is an example block diagram illustrating a set of MP table configurations to service an employee's benefit plan offerings, according to an example embodiment.

In the drawings, like reference numbers generally indicate identical or similar elements. Additionally, generally, the left-most digit(s) of a reference number identifies the drawing in which the reference number first appears.

DETAILED DESCRIPTION

Figure 1:
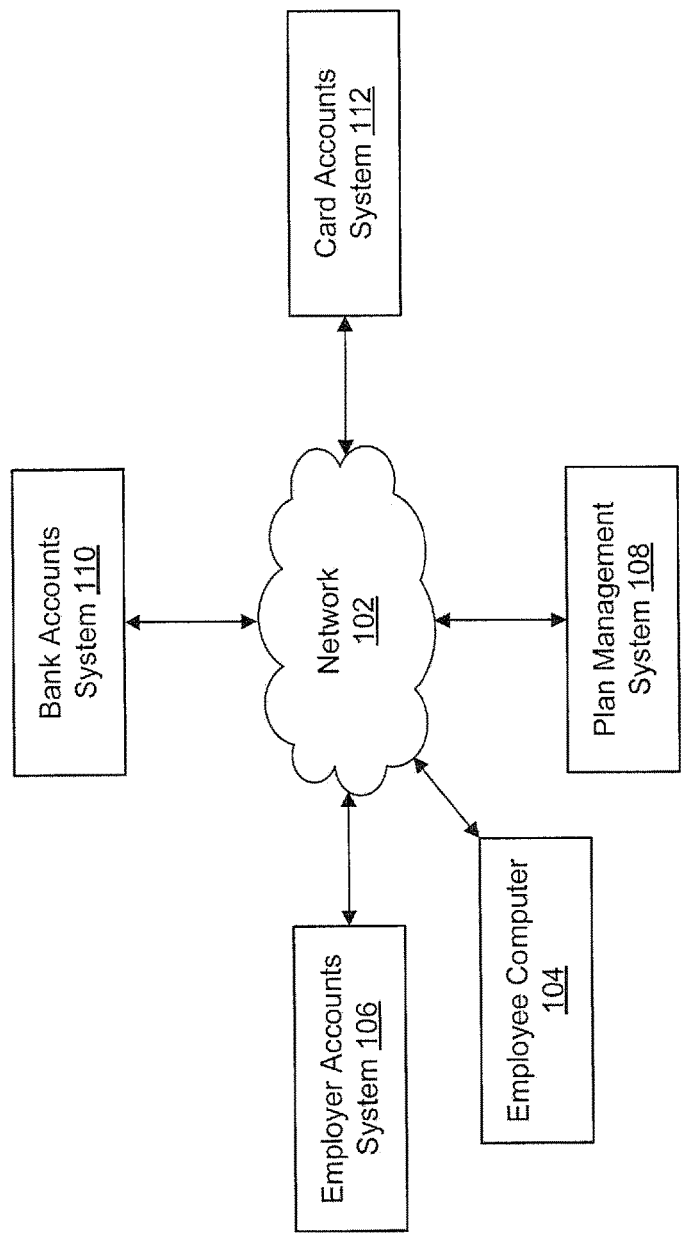
FIG. 1 is an example block diagram illustrating the multiple systems of respective entities involved in configuring and processing the multiple accounts within a benefit plan, according to an example embodiment.

To avoid current complications with maintaining configurations for multiple employees across multiple benefit plans, flexible multi-purse tables can be used to organize the multiple accounts of a large number of benefit plans. The flexible multi-purse tables may reduce the likelihood of redesigning or selecting new configurations when an employee's benefit plan changes. Additionally, the flexible multi-purse tables retain priority rules to enable processing of services and goods payment using the multiple accounts of the benefit plan.

Provided herein are system, method and/or computer program product embodiments, and/or combinations and sub-combinations thereof, for providing flexible and prioritized multi-purse (MP) tables for multi-account benefit plan management and processing. Embodiments enable a plan management system to utilize MP tables with access indicators to efficiently represent a wide variety of benefit plans for employees. The provided flexibility may reduce the set-up time for an employee's benefit plan and the likelihood of a needed overhaul to data structures within benefit plan databases of the plan management system. The provided priority of an MP table may enable fast and accurate processing of claims and transactions according to the rules and restrictions associated with each of the multiple accounts of the benefit plan. In an embodiment, an MP table may be further utilized in conjunction with self-attestation to configure and provide a deductible-restricted account within the benefit plan.

A benefit plan may contain multiple accounts (i.e. one or more accounts) that are used to pay for qualified expenses as dictated by the respective accounts of the benefit plan. An account may be any tax-advantaged financial account that is set up by an employee through, for example, a cafeteria plan of the employer. The benefit or cafeteria plan selected by the employee may allow an employee to contribute a portion of his pre-tax earnings at the end of each pay period to fund one or more of the contribution funded accounts (CFAs) of the benefit plan. Depending on the account type as specified by the employer's cafeteria plan, an account may be employer funded, employee funded, or both employer and employee funded. The funds within an account of the benefit plan may be used to pay for qualified expenses as established by eligible service restrictions in the cafeteria plan for that account. For example, a benefit plan offered by an employer may include one or more of health savings accounts (HSAs), health reimbursement accounts (HRAs), and flexible spending accounts (FSAs), such as health FSAs, dependent care FSAs, limited-purpose FSAs, adoption related FSAs, among other types of accounts such as wellness accounts.

However, not all combinations of account types within a benefit plan are available. For example, in general, tax laws and regulations forbid a benefit plan from providing both a general-purpose health FSA and an HSA at the same time within the same benefit plan. But, a benefit plan including a limited-purpose health FSA and an HSA may be allowable. A general-purpose account, such as a general-purpose health FSA, may include a large variety of eligible services such as dental, vision, pharmacy, medical, and other services. But, a limited-purpose account, such as a limited-purpose health FSA, may be limited in the number of eligible services as compared to a general-purpose account. For example, a limited-purpose health FSA may only include dental and vision as eligible service types. In an embodiment and as discussed below, the flexibility provided by the access indicators of MP tables may enable these regulations and restrictions to be efficiently configured and re-configured using a pre-existing MP table.

The benefit plan may additionally provide accelerated access to funds within an account, such as an HSA, through a corresponding contribution funded on-demand account. For example, the HSA may itself be comprised of two sub-accounts: the traditional HSA (HSAT) that is employer or employee funded, and an HSA OnDemand (HSAOD). The contribution funded on-demand account, HSAOD, may be initialized with a sum of contributions to be made in a plan year, while the HSAT may contain a zeroed balance. In an embodiment, the HSAT may contain a preexisting balance from the previous plan year. As contribution amounts from each pay period are added to the HSAT, the same contribution amounts are deducted from the HSAOD to maintain total available funds within the HSA including the HSAT and the HSAOD. Therefore, a contribution from a pay period effectively transfers the specified contribution amount from the HSAOD to the HSAT. By enabling an employee accelerated access to future contributions stored within the HSAOD, the employee may more likely be able to pay for larger qualified expenses starting from the first day of the plan year. Greater detail for providing an on-demand based account is provided in reference to U.S. Provisional Application No. 62/131,057.

FIG. 1 illustrates benefit plan system 100 for configuring and processing the multiple accounts within a benefit plan across multiple entities including an employer, an employee, a bank, a card vendor, and a plan manager, according to an embodiment. Benefit plan system 100 includes network 102, employee computer 104 operated by the employee, employer accounts system 106 of the employer, plan management system 108 of the plan manager, bank accounts system 110 of the bank, and card accounts system 112 of the card vendor. Each of the systems or computers may be implemented using one or more processors. Although the systems are depicted as remote systems connected via network 102 in benefit plan system 100, one or more systems may be operated by or maintained by one entity. For example, bank accounts system 110 and card accounts system 112 may be part of a single system operated by one entity.

Network 102 may enable plan management system 108 to communicate with and configure the multiple accounts associated with a benefit plan across the multiple systems: employer accounts system 106, bank accounts system 110, and card accounts system 112. In an embodiment, employee computer 104 may communicate with and view benefit plan information stored on any of the depicted systems. In an embodiment, employee computer 104 may access a portal provided by plan management system 108 that acts as an interface for viewing benefit plan information associated with one or more of the depicted systems. Network 102 may be an enterprise wide area network (WAN) utilizing Ethernet communications, although other wired and/or wireless communication techniques, protocols and technologies may be used.

Figure 2:
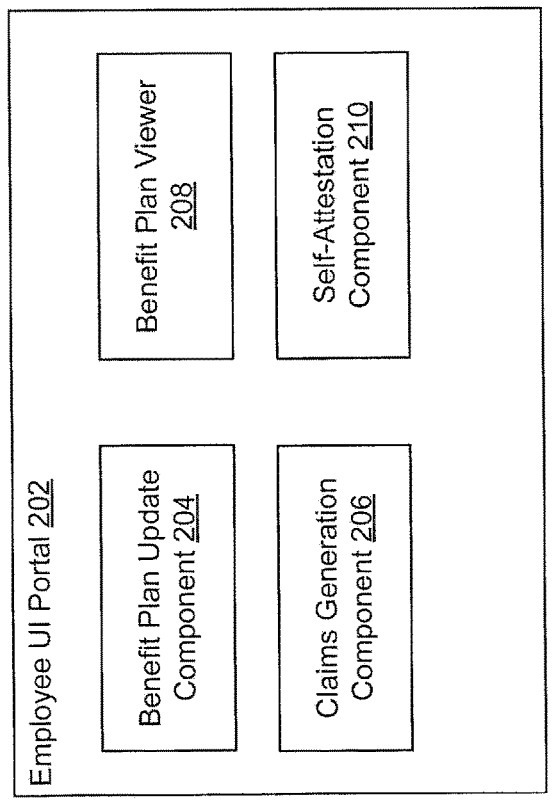
FIG. 2 is an example block diagram illustrating the components within an employee user interface portal to provide an employee access to the multiple accounts within his benefit plan, according to an example embodiment.

FIG. 2 illustrates exemplary components within an employee user interface (UI) portal 202 that employee computer 104 may access via network 102, according to an example embodiment. In an embodiment, employee user UI portal 202 is accessible to the employee via a mobile device operated by the employee. Employee UI portal 202 may enable the employee to access his benefit plan and associated multiple accounts managed by plan management system 108. In the exemplary embodiment of FIG. 2, employee UI portal 202 may include benefit plan update component 204, claims generation component 206, benefit plan viewer 208, and self-attestation component 210. In an embodiment, one or more of benefit update component 204, claims generation component 206, benefit plan viewer 208, and self-attest component 210 may be accessible via respective panes on a homepage of employee UI portal 202 or via a menu toolbar of employee UI portal 202.

Benefit plan update component 204 may be configured to enable an employee operating employee computer 104 to update information related to his benefit plan. In an embodiment, benefit plan update component 204 may be operated by the employee to select a benefit plan (or cafeteria plan) that includes multiple accounts as provided by the employer. Employee UI portal 202 may send the selection results to employer account system 106 to set up or update, for example, the benefit plan.

In an embodiment, depending on restrictions established by the cafeteria plan and tax or policy law, the employee may make adjustments to the cafeteria plan throughout the plan year via benefit plan update component 204. For example, the employee can add or remove additional accounts within the benefit plan during open enrollment or within a special enrollment period if a qualifying life event occurs. Other capabilities of benefit plan update component 204 may include allowing the employee to invest funds within accounts associated with his benefit plan, to manually contribute or transfer funds of his accounts associated with the benefit plan, or to terminate accounts associated with his benefit plan.

Claims generation component 206 may be configured to enable an employee operating employee computer 104 to enter claims to be paid or reimbursed using funds within the multiple accounts within his benefit plan. The employee may manually enter a claim having service information and a claim amount. The service information may include, for example, a service type, a date of the service, and an entity providing the service. The entered claims may additionally be required to include a proof of service such as a receipt used to verify the service and the claim amount. In an embodiment, claims generation component 206 may be configured to provide a pre-generated claims request template according to the benefit plan. For a benefit plan associated with a health related plan, claims generation component 206 may, for example, pre-generate templates for various services and items covered by the health plan.

In an embodiment, an account, such as an FSA, within a benefit plan may be a deductible-restricted account. For example, although an employee may not select both a general-purpose FSA and a general-purpose HSA within his benefit plan, he may select a limited-purpose FSA and a general-purpose HSA. However, upon paying the deductible amount associated with his benefit plan or deductible-restricted account, the limited-purpose FSA may be converted into a general-purpose FSA. To enable support of such deductible-restricted accounts and ease of fulfilling the deductible requirement, self-attestation component 210 may be configured to enable an employee to manually submit attestation documentation to plan management system 108.

Using the attestation documentation, plan management system 108 may enable a deductible-restricted account of the benefit plan (e.g. a limited-purpose FSA) to convert to a general-purpose FSA that covers additional eligible services based on a determination of whether a deductible associated with the deductible-restricted account has been met.

Benefit plan viewer 208 may be configured to enable an employee operating employee computer 104 to view current statuses and balances of the multiple accounts within the benefit plan. In an embodiment, the employee may be able to track transactions and respective statuses for each account. Statuses may include those known to one skilled in the art, such as SETTLED if a transaction has been processed or PENDING if the transaction is undergoing processing. In an embodiment the SETTLED status may further include or instead be a PAID status to indicate a transaction was successfully processed or INELIGIBLE if the transaction could not be processed, i.e. denied. The PENDING status may be associated with a transaction under review or in the process of being reimbursed.

In an embodiment, benefit plan viewer 208 may enable the employee to view balances of the multiple accounts within his benefit plan. Benefit plan viewer 208 may also allow the employee to see transactions and associated claims made against each of the accounts, as well as attestation processing for deductible-restricted accounts.

Figure 3:
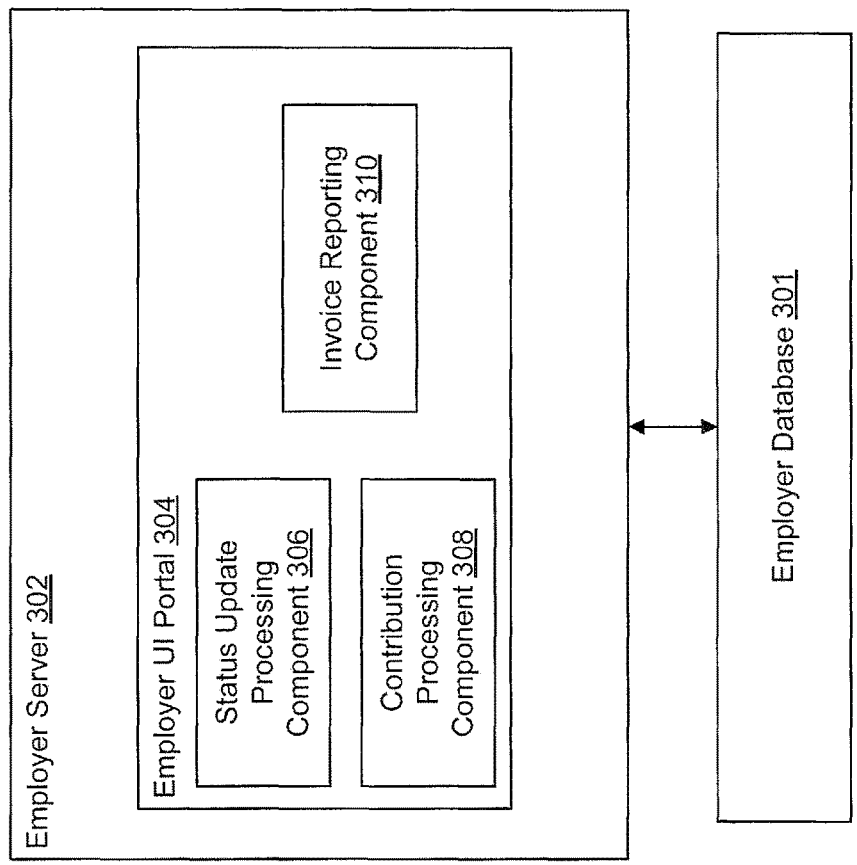
FIG. 3 is an example block diagram illustrating the components within an employer accounts system to interact with a plan management system for configuring and processing the multiple accounts within a benefit plan, according to an example embodiment.

FIG. 3 illustrates employer accounts system 300 maintained by an employer for interacting with plan management system 400 for configuring and processing the multiple accounts within a benefit plan, according to an exemplary embodiment of employer accounts system 106. Employer accounts system 300 may include employer server 302 and employer database 301. Though depicted as a single server, employer server 302 may be representative of a plurality of servers, each of which may be implemented by one or more processors. Likewise, employer database 301 may be representative of a plurality of databases coupled to a plurality of employer servers.

Employer database 301 may be configured to store employee information, employer benefit plan offerings, and employee selections of benefit plan offerings. Employee information may include various information such as census information, salaries, or employment statuses. Employer benefit plan offerings may enable an employee to select from a number of his or her employer's benefit plan offerings, each benefit plan offering including one or more of the following accounts: an HSA, an HRA, an FSA, and other tax-advantaged financial accounts. In an embodiment, one or more of the selected accounts may be additionally user-customized (e.g. have an On-Demand portion or be a limited purpose account). Employee selections may also include information associated with an employee's selection of an employer plan offering for a plan year, employees' selected contributions to fund accounts of the benefits plan, and whether funds of one or more accounts are being invested. In an embodiment, employer database 301 may also store account information and associated transaction logs. Transaction logs may, for example, track contributions and claims made towards one or more of the accounts within the benefit plan.

Employer server 302 may configure employer user interface (UI) portal 304. Employer UI portal 304 may include status update processing component 306, contribution processing component 308, and invoice reporting component 310. One or more of these depicted components may be implemented as processing systems comprising one or more sub-components. These sub-components may include an interface for communicating within and/or across systems and a distribution component for sending information to other components and/or across systems. For example, contribution processing component 308 may be implemented as a contribution processing system including an interface for receiving information and a distribution component for sending information.

Generally, employer UI portal 304 may be configured to allow an employer, particularly benefits administrators of the employer, to manually adjust or input employee statuses, employer benefit plan offerings, employee selections of the benefit plan offerings, and contribution proportions of employee income and associated amounts through the use of various components as will be discussed. The adjustments may be performed by the various components and sent to plan management system 108 to update the benefit plans managed at the plan management system 108.

In an embodiment, employer UI portal 304 may only adjust and view employer or employee contributions as specified by an employer benefits plan. Other contributions, such as contributions that are outside of the employer benefits plan and made by an employee through employee UI portal 202 may not be viewable. In addition to viewing details, employer UI portal 304 may be configured to provide analytics and report generation capabilities.

Status update processing component 306 within employer UI portal 304 may be configured to enable an employer to input information related to an employee's benefit plan selected from the employer's benefit plan offerings. For example, status update processing component 306 may enable an employer to input (or transfer) information to adjust an employee's enrollment within one or more accounts of the benefit plan. Accordingly, status update processing component 306 may send update information to plan management system 108 that manages and updates the benefit plans. In an embodiment, information for updating the benefit plans may include information indicating enrollment of a new or existing employee into one or more accounts in accordance with an employee's selected benefit plan. For enrollment, status update processing component 306 may additionally be configured to send census and eligibility information of the employee, which may be retrieved from employer database 301.

In an embodiment, status update processing component 306 may be configured to enable the employer to input and send updates regarding the employer's provided benefit plan offerings to plan management system 108. For example, for a plan year, the employer may decide to enable its employees to select a limited-purpose HRA that may only be used to pay for pharmaceutical services as part of its benefit plan offerings. This update in the employer's benefit plan offerings may need to be sent to plan management system 108 such that an employee's selected benefit plan may be accurately configured in plan management system 108 using an appropriate MP table.

Contribution processing component 308 may be configured to process and manage an employee's contributions to one or more accounts of his selected benefit plan per pay period. First, based on employee enrollment and update information stored in employer database 301, contribution processing component 308 may generate a contributions file specifying a proportion of every employee's income (or alternatively an actual contribution amount) for a pay period. In an embodiment, the contribution file may only contain contribution information of select employees, e.g. employees enrolled in the employer's benefit plan offerings. Accordingly, the generated contributions file may be sent to plan management system 400 for each pay period. Based on a contribution funding request (CFR) file generated by plan management system 400 and specifying which of the contribution amounts are requested, contribution processing component 308 may send one or more of the contribution amounts within the contribution file to plan management system 400.

Invoice reporting component 310 may be configured to periodically receive and report invoices generated by plan management system 400. In an embodiment, invoice reporting component 310 may receive an employer weekly funding request (EWFR) detailing payback records and billing records for employees enrolled in the benefit plans as provided by the employer's benefit plan offerings. In an embodiment, the employer funding request may be sent bi-weekly or quarterly, etc., and not necessarily on a weekly basis. The invoices may be utilized to synchronize funds within accounts of benefit plans between employer accounts system 300 and plan management system 400.

Figure 4:
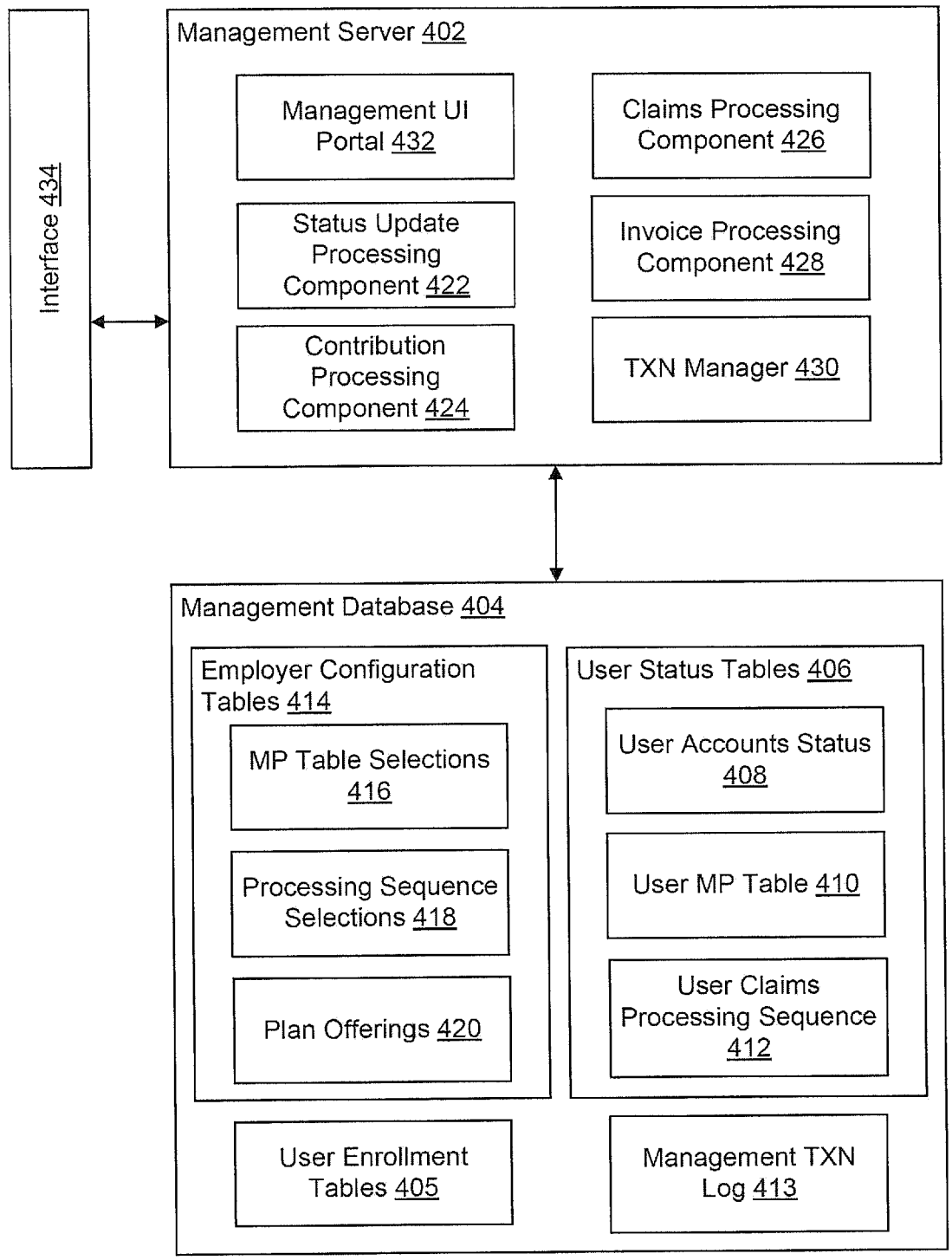
FIG. 4 is an example block diagram illustrating the components within a plan management system to configure the multiple accounts within a benefit plan and process claims at a plan manager, according to an example embodiment.

FIG. 4 illustrates plan management system 400 maintained by a plan manager for managing benefit plans of one or more employers and corresponding employees across multiple entities, according to an exemplary embodiment of employer accounts system 106. Plan management system 400 may include interface 434, management server 402, and management database 404. Though depicted as a single server, management server 402 may be representative of a plurality of servers, each of which may be implemented by one or more processors. Likewise, management database 404 may be representative of a plurality of databases coupled to a plurality of management servers. Management database 404 may be implemented on one or more storage devices.

Interface 434 may be configured to enable plan management system 400, specifically management server 402, to communicate with one or more of the systems depicted in FIG. 1. Though depicted as a separate component, interface 434 may be implemented within management server 402, according to an exemplary embodiment.

Management server 402 may be configured to include management UI portal 432, status update processing component 422, contribution processing component 424, claims processing component 426, invoice processing component 428, and TXN manager 430. One or more of the depicted components may be implemented as processing systems comprising one or more sub-components. These sub-components may include an interface for communicating within and/or across systems and a distribution component for sending information to other components and/or across systems.

Management UI portal 432 may be configured to allow a plan manager and its employees the capability to adjust and maintain employee's statuses, employers' benefit plan offerings, and information related to an employee's selected benefit plan. Adjustments made within management UI portal 432 may be propagated to employer accounts system 106, bank accounts system 110, and/or card accounts system 112. In an embodiment, management UI portal 432 may be configured to allow the plan manager to view details of employee's benefit plan including statuses, balances, and transactions of claims filed for the one or more accounts of the benefit plan. In addition to viewing details, management UI portal 432 may be configured to provide analytics and report generation capabilities.

Status update processing component 422 may be configured to communicate with status update processing component 306 in employer accounts system 300 in order to configure and provide an employer's benefit plan offering and an employee's selected accounts within his benefit plan across the multiple systems of FIG. 1, including plan management system 108, bank accounts system 110, and card accounts system 112. For example, status update processing component 422 may receive updates to an employer's benefit plan offering. In an embodiment, status update processing component 422 may receive, from bank accounts system 700, information indicating that funds within one or more of the accounts of the benefit plan are being invested. As discussed below, the employer updates may be stored in plan offerings 420 and MP table configurations used to represent the employer benefit plan offerings may be determined and stored in MP table selections 416.

Additionally, status update processing component 422 may receive a request from employer accounts system 108 or employee computer 104 for updating an employee's benefit plan. Accordingly, status update processing component 422 may update records stored in management database 404, such as user enrollment tables 405, and configure the accounts of the benefit plan in user account status 408. Status update processing component 422 may also include an MP processing component to configure user MP table 410 for the employee based on MP table selections 416 and user enrollment tables 405. Then, status update processing component 422 may initiate a reconciliation process and send update information to bank accounts system 110 and card accounts system 112. In an embodiment, updating the benefit plan may include enrolling a new or existing employee into a new benefit plan in accordance with an employee's selected employer benefit plan. Further details are described with regards to FIG. 8.

Contribution processing component 424 may be configured to communicate with contribution processing component 308 in employer accounts system 300 in order to reconcile an employee's contributions across the multiple systems of FIG. 1 including plan management system 108, bank accounts system 110, and card accounts system 112. Upon receiving a contribution file from employer accounts system 106, contribution processing component 308 may resolve the pledged contributions to generate a CFR as described in FIG. 3. Then, contribution processing component 424 may reconcile the accounts within the benefit plan before generating and sending transactions to bank accounts system 110 and card accounts system 112 to reconcile one or more accounts of the benefit plan across the multiple systems of FIG. 1.

Claims processing component 426 may be configured to communicate with claims generation component 206 in employee UI portal 202 in order to reconcile an employee's submitted claims across the multiple systems of FIG. 1, including plan management system 108, bank accounts system 110, and card accounts system 112. Upon receiving a claims request from employee UI portal 202, claims processing component 426 may resolve the claims request using user status tables 406 and user MP table 410 associated with the user to determine whether the claims request may be serviced. Further details are described with regards to FIG. 9.

Subsequently, account balances and statuses within user accounts status 408 may be updated and the account information may be sent as transactions to bank accounts system 110 and card accounts system 112 to reconcile the accounts of the benefit plan at the bank and card vendor, respectively. In an embodiment, claims processing component 426 may also or instead be configured to communicate with a benefits plan manager, which submits an employee's claims.

In an embodiment, claims processing component 426 may be similarly configured to communicate with card accounts system 112 in order to reconcile an employee's claim(s) request made on a card across the multiple systems of FIG. 1, including plan management system 108, bank accounts system 110, and card accounts system 112. A claims request may be generated within card accounts system 112 when a user swipes a card associated with one or more accounts of the benefit plan to pay for services. Upon receiving a claims request, likely in the form of payment transactions at card accounts system 112, card accounts system 112 may process the claim and send results to plan management system 400 via claim processing component 426 or TXN manager 430. Claim processing component 426 may resolve the claims request as discussed above. In an embodiment, no transactions may need to be sent to card accounts system 112 because the claims request was originated and processed in card accounts system 112.

Invoice processing component 428 may be configured to periodically communicate with invoice reporting component 310 in employer accounts system 300 in order to keep balances maintained within employer accounts system 106 and plan management system 108 in sync. For example, during contribution processing, invoice processing component 428 may generate and send a CFR, as described in FIG. 3, to employer accounts system 106. In another example, during claims processing, invoice processing component 428 may generate and send an EWFR detailing payback records and billing records for an employer's employees, as described in FIG. 3.

TXN manager 430 may be configured to manage transactions received from any of the systems in FIG. 1 and generate associated bank and card transactions while processing employee status updates, employee contributions, and employee claims via one of the components depicted in management server 402. Received transactions and generated transactions may be stored in management TXN log 413. In an embodiment, management TXN log 413 may be stored within user status tables 406 for an employee. As part of reconciling the accounts of the benefit plan across the multiple systems of FIG. 1, TXN manager 430 may send the generated bank and card transactions to TXN manager 704 in bank accounts system 110 and TXN manager 522 in card accounts system 500, respectively.

Management database 404 may be configured to store employer information and employee information via one or more of the following database tables: employer configuration tables 414, user enrollment tables 405, user status tables 406, and management TXN log 413. Employer configuration tables 414 may include MP table selections 416, processing sequence selections 418, and plan offerings 420. User status tables 406 may include user accounts status 408, user MP table 410, and user claims processing sequence 412. FIG. 6 illustrates exemplary user status tables 602, including user accounts status 604, user MP table 606, and user claims processing sequence 608, that correspond to status tables 406, user accounts status 408, user MP table 410, and user claims processing sequence 412, respectively.

Employer configuration tables 414 may be configured to store, within plan offerings 420, employer information such as employer benefit plan offerings including associated accounts and specific options. For example, a benefit plan offering provided by an employer may enable an employee to select one or more of an FSA, HSA, and HRA. Additionally, the employer may enable an employee to couple one or more of the possible accounts to an on-demand account. Furthermore, the employer may enable an employee to select whether to include a limited-purpose or general-purpose version of an account in his or her benefit plan.

In an embodiment, plan offerings 420 may also store rules and restrictions associated with the accounts. For example, a rule that is based on tax or policy laws and regulations may indicate whether two accounts having different types may be part of the same benefit plan offering for an employee. These rules and restrictions may also be specific to the employer, such as a restriction indicating which account types the employer is offering within the benefit plan offering.

User enrollment tables 405 may be configured to store employee information including employee selections of and updates to a benefit plan having one or more of the accounts provided in plan offerings 420. Other employee information received from employer account system 300 may include various information such as census information, salaries, employment status, associated employer, and contribution amounts. In an embodiment, employee information may also include investment information such as a proportion of funds within one or more accounts that are currently allocated for investing. Investment information may be received by investment entities via file and web services.

In an embodiment, the multiple accounts of the benefit plan offering that is selected by the employee may be set up or configured in user status tables 406 as user accounts status 408. User account status 408 may include additional fields for every account including: a valid start and end date for when an account may service claims, eligible services which funds of an account may be used to pay, available balance of an account, and an access indicator for an account. An example for an employee is provided in user account status 604 in FIG. 6. In this exemplary employee's benefit plan, the employee has selected an HSA, FSA, and an HRA. He has further selected on-demand access to his HSA, indicated as the account HSAOD. As depicted in user accounts status 604 and further explained below, the Account IDs that correspond to the employee's benefit plan may include HSA, FSAO, FSAE, HSAOD, and HRA.

In general, an account may either be valid within a plan year or may rollover remaining funds within a plan year into the next plan year. For example, the HRA is valid starting on Jan. 1, 2015 and ends in Dec. 31, 9999. The large end date of the HRA is representative of a rollover account, in which the funds within the account do not expire from year to year. Other representations for indicating a rollover account type may be possible.

In an embodiment, depending on an account of the benefit plan offering, the account may pay for claims for a grace period extending beyond a single plan year. In this embodiment, an account having a grace period, such as the FSA depicted in user account status 604 having a grace period of 3.5 months, may be configured as parallel accounts, such as FSA Odd (FSAO) and FSA Even (FSAE). The parity suffix O or E may be indicative of whether the year of the start date is odd or even, respectively. FSAO and FSAE are parallel accounts because there exists a service date, such as Mar. 1, 2015, in which available funds from any of FSAO or FSAE may be used to pay for eligible services. Two accounts are used to track and apply the different years' funds separately. The employee may have selected a benefit plan including an HSA, FSA with a grace period enabled, an HRA, and an HSA with on-demand capabilities, effectively resulting in at most five accounts that may be enabled via respective Access Indicators. Though not shown in user account status 604, an additional account may be opened within the plan year. Such an account may be associated with a shortened plan year and indicated by a suffix S, for example an FSA Shortened (FSAS).

The Access Indicators may enable status processing component 422 to reconfigure statuses of the accounts when updates are made to the benefit plan. For example, in an embodiment, when the employee invests funds within an account with on-demand capabilities, such as an HSA, funds within the associated on-demand account may need to be temporarily frozen until the funds are no longer invested. As depicted in user account status 604, status processing component 422 disabled the Access Indicator for the account HSAOD within user accounts status 604 indicating that the funds within the HSAOD are temporarily frozen. When the funds are no longer invested, status processing component 422 may re-enable the HSAOD to represent the current status of the employee's accounts within his benefit plan.

MP table selections 416 may include a set of MP table configurations that have been selected to enable the combinations of accounts offered within employer benefit plan offerings to be represented. A multi-purse (MP) table configuration may be a template for a data structure that is used to represent the accounts selected for a benefit plan and represent various rules and restrictions associated with the accounts. Based on the benefit plan selected by the employee and stored within plan offerings 420, one of the MP table configurations may be selected to generate an MP table for the employee to represent his selected benefit plan.

In an embodiment, an MP table configuration indicates which accounts pay for which expenses and in what priority/order. The MP table configuration may also include the following fields: account, priority, eligible services, and access indicator. The priority may represent a priority for using one or more of the multiple accounts to pay a claim qualifying under eligible services of respective accounts. Depending on the priority configurations, a lower number may indicate a higher priority. The eligible services may be associated with the types of services that may be purchased using funds within a particular account. In an embodiment, the eligible services may include one or more of dental (D), vision (V), medical (M), and pharmacy (P). In an embodiment, the MP table configuration may be associated with eligible merchant category codes (MCC) determined from the eligible services. The access indicator field associated with an account may be enabled when the account is part of the user's benefit plan. The use of the access indicator field may reduce the likelihood of needing to reassign an MP table to a different MP table configuration. An example MP table that is generated for an employee is depicted and further explained with regards to limited user MP table 606 of FIG. 6.

To preserve memory and processing efficiency, the MP table configuration should typically be designed to be as compact as possible and contain as few accounts as possible. However, a fixed and compact MP table generated using a compact MP table configuration may have to be regenerated from a different MP table configuration to accommodate new account types or restrictions as employer offerings changes, employee selection changes, or tax and policy law changes. In an embodiment, to enable greater flexibility, the MP table configuration may contain one or more empty account types or undefined accounts and associated fields. These empty accounts serve as placeholders to enable more efficient integration of new account types into the MP table configurations by reconfiguring pre-existing MP table configurations. For example, when a new type of account is introduced by tax and policy law or is included in an employer's benefit plan offering, one of the empty and undefined accounts may be configured as the new account type. Therefore, the existing configuration structures of management database 404 may not need to be restructured. However, once the number of empty rows are used, restricting of management database 404 may be necessary.

Returning to FIG. 4, upon selecting an MP table configuration from MP table selections 416, status processing component 422 may configure an MP table for the employee in MP table 410 in user status tables 406. An exemplary user MP table 606 is depicted in FIG. 6. As depicted, each account may be associated with a priority, eligible services, and an access indicator. In this example, the NULL account is representative of an empty or placeholder account and therefore has a DISABLE status as its Access Indicator. As discussed with regards to user account status 604, HSAOD has been disabled as a result of an account status change. Notably, HSAOD within user MP table 606 may be disabled without requiring a new MP table configuration to be designed or selected.

In an embodiment, the eligible services and priority fields may enable the multiple accounts of the benefit plan to collectively service a claim. For example, when the employee's claim for dental services is received, claims processing component 426 may first determine whether the claim type corresponds to an allowable MCC associated with user MP table 606. Then, claims processing component 426 may select funds within FSA-L because it has priority 1 and the eligible services includes dental ("D") services. If the funds within the FSA-L are insufficient, claims processing component 426 may draw further funds from HRA, which has the next priority 2 and also covers dental services. Although FSA-G has a higher priority (i.e. 1 is smaller than 2), FSA-G is disabled as specified by a respective access indicator.

The priority fields may be further utilized to comport with access rules of accounts within the benefit plan. For example, since an FSA may be limited to a plan year, any remaining funds from an FSA of a benefit plan should be used to service claims before accessing funds from other available accounts of the benefit plan. Accordingly, an FSA as represented within an MP table may be assigned higher priorities as compared to other accounts such as HSAs or HRAs.

User MP table 606 also depicts how the flexible MP table may support both limited-purpose and general-purpose accounts. For example, user MP table 606 contains an FSA-L ("limited") account and an FSA-G ("general") account associated with eligible services "D,V" and "D,V, M,P," respectively. As indicated by the access indicator, the limited-purpose account, FSA-L, has been enabled and the general-purpose account, FSA-G, has been disabled. By incorporating additional rows and access indicators within user MP table 606, when the employee changes from FSA-L to FSA-G in the next plan year, only the access indicators of the pre-existing user MP table 606 may need to be updated.

In an embodiment, a benefit plan offering may include a deductible-restricted account, such as a deductible-restricted FSA, if the employee also enrolls within a high deductible health plan (HDHP). In this embodiment, the FSA may operate as a limited-purpose FSA (indicated by FSA-L) and may cover limited eligible services, for example, "D,V," until the deductible of the HDHP has been met. Once the deductible has been met, the limited-purpose FSA (FSA-L) may be converted into a general-purpose FSA (FSA-G) and cover eligible services including "D,V,M,P." Though not depicted, MP table 606 may similarly service a deductible-restricted HSA by configuring access indicators for a limited-purpose version and a general-purpose version of the HSA.

Therefore, the access indicators in combination with the placeholder accounts may enable status processing component 422 to reconfigure an existing MP table for an employee when updates are made to the benefit plan. Status processing component 422 may not need to redesign an MP table configuration or select a new MP table configuration to generate a new MP table to service the employee's updated benefit plan.

In an embodiment, configuring user MP table 410 to include mutually exclusive account types, such as the FSA-L and FSA-G accounts presented in user MP table 606, is inefficient. For example, separate balances corresponding to the FSA-L and FSA-G may need to be maintained as an employee changes between the account types from plan year to plan year. In an embodiment, user MP table 410 may, instead, be selected from a set of user MP tables configured to represent any possible selection of CFAs within an employee's benefit plan.

FIG. 11 illustrates MP table set 1100 of user MP tables 1102 that may be used to represent any employee selection of CFAs within the employee's benefit plan offerings, according to an example embodiment. The four following fields enable status update processing component 422 to minimize the number of MP tables 1102 within MP table set 1100: Account, Priority, Eligible Services, and Access Indicator.

User MP table 1102A may be a "Standard" or default MP table that represents unrestricted account types including an FSA-G. And user MP table 1102B may be a "Limited" MP table that represents restricted account types and any combination of selected CFAs having limited accounts. In an embodiment, no designation between FSA-G and FSA-L is needed within a single user MP table 1102 because no mutually exclusive accounts may be configured within the single user MP table 1102.

For example, an employee having an FSA-G and HRA within his or her benefit plan may be assigned user MP table 1102A that is configured as shown. Other employees having only one type of account within their respective benefit plans may also be assigned user MP table 1102A. In a following plan year, the employee having the FSA and HRA may choose to, for example, add a traditional HSA and remove the previous HRA from his or her previous benefit plan. This specific selection may be permissible if the FSA-G is converted into an FSA-L. During update of the employee enrollment, status update processing component 422 may select user MP table 1102B for the employee. As shown, the selected user MP table 1102B has different access indicators. Status update processing component 422 may further configure access indicators of user MP table 1102B as depicted in FIG. 11.

Returning to FIG. 4, in an embodiment, plan management system 400 may have selected MP table configurations for the employer based on the received and stored plan offerings 420 of the employer. In this embodiment, plan management system 400 may store, within MP table selections 416, associations between possible plan offerings 420 and respective MP table configurations. By storing these associations, upon receiving an employee's selected benefit plan that is provided by the employer, plan management system 400 may select an appropriate MP table configuration based on the stored associations. The selection may be through a look-up procedure to immediately locate the MP table configuration.

In an embodiment, MP table configurations may be stored outside of employer configurations 414 and contain configurations for representing any combination of accounts for a benefit plan, including combinations not enabled or available by the employer. Upon receiving an employee's selected benefit plan, plan management system 400 may select an MP table configuration representative of the selected benefit plan based on the benefit plan and the MP table configurations. Further detail with regards to selecting an MP table configuration is provided with regards to FIG. 8.

Processing sequence selections 418 may be configured to select and store claims processing sequences for the employee. A processing sequence may include a prioritized list of account identifiers (IDs), each account ID associated with a corresponding CFA of the employee's benefit plan. In an embodiment, the processing sequence may include a prioritized list of all possible account IDs corresponding to all possible accounts provided within employer benefit plan offerings.

Upon enrollment or update to an employee's benefit plan, status update processing component 422 may configure user claims processing sequence 412 for an employee using processing sequence selections 418. User claims processing sequence may include the ordered list of account IDs specifying the order to draw funds from accounts while processing an employee's claim.

In an embodiment, when making an update to an employee's benefit plan enrollment or when enrolling an employee into his benefit plan including a plurality of CFAs, status update processing component 422 may not need to reconfigure user claims processing sequence 412. Instead, status update processing component 422 may assign a corresponding account ID from the processing sequence to each CFA of the plurality of CFAs. CFAs of an employee's benefit plan may also be reassigned to other account IDs in subsequent years as necessary. For example, when updating an employee's benefit plan in the following year, an employee's HSA previously assigned to an account ID of HSAE may need to be reassigned to an account ID of HSAO to reflect the new plan year. But, an employee's HSA previously assigned to an account ID of HSA may not need to be reassigned. In an embodiment, the reassignment of account IDs may be needed to manage account types that extend the service of claims beyond the plan year. As discussed above, an account may be represented as parallel accounts indicated by the suffix E or O when the account extends service of claims for a particular plan year beyond the plan year for a grace period. A claims processing sequence, such as user claims processing sequence 608 depicted in FIG. 6, may include an order to prioritize processing of the parallel accounts in addition to the priorities already assigned in user MP table 410 for the employee's benefit plan. For example, for a current year of 2015, a parallel account with an even indicator "E," such as FSAE, should be processed first because FSAE will expire before the other parallel account, FSAO (e.g., the 2014 plan will expire a few months into 2015). Though not depicted, the claims processing sequence may also include processing of accounts enrolled in a shortened planned year. The last account ID "RVLOC" may be representative of a revolving line of credit or an exception. This account ID may be serviced if, for example, funds were out of synch between the multiple systems of FIG. 1. For example, card accounts system 112 may have initially approved servicing of the claim with the funds of the benefit plan. But, upon processing of the claim at plan management system 108, the funds could not be found. In this example, plan management system 108 may issue an "RVLOC" to track the missing funds. Therefore, "RVLOC" may indicate funds that were charged but could not be serviced. Invoice processing component 428 may subsequently request the missing funds from the employer through an EWFR.

In an embodiment, a claims processing sequence, such as user claims processing sequence 608, may be associated with MCC codes that represent eligible and payable services as specified in the benefit plan offering. When processing a claim or transaction corresponding to an MCC code of 4119, for example, claims processing component 426 may look up MCC code 4119 in an MCC table to find an associated claims processing sequence, such as user claims processing sequence 608. Then, claims processing component 426 may process the claim according to user claims processing sequence 608. Returning to FIG. 4, management TXN log 413 may store transactions received from any system of FIG. 1. In an embodiment, management TXN log 413 primarily stores transaction records related to employee contributions and claims. A card TXN log and a bank TXN log may be associated with management TXN log 413. The card TXN log may contain card transactions generated while processing a transaction stored in management TXN log 413. The bank TXN log may contain bank transactions generated while processing a transaction stored in management TXN log 413. These card and bank transactions may be generated, for example, when processing contributions and claims. In an embodiment, records within the card TXN log and the bank TXN log may be stored within one transaction log, such as management TXN log 413.

Figure 5:
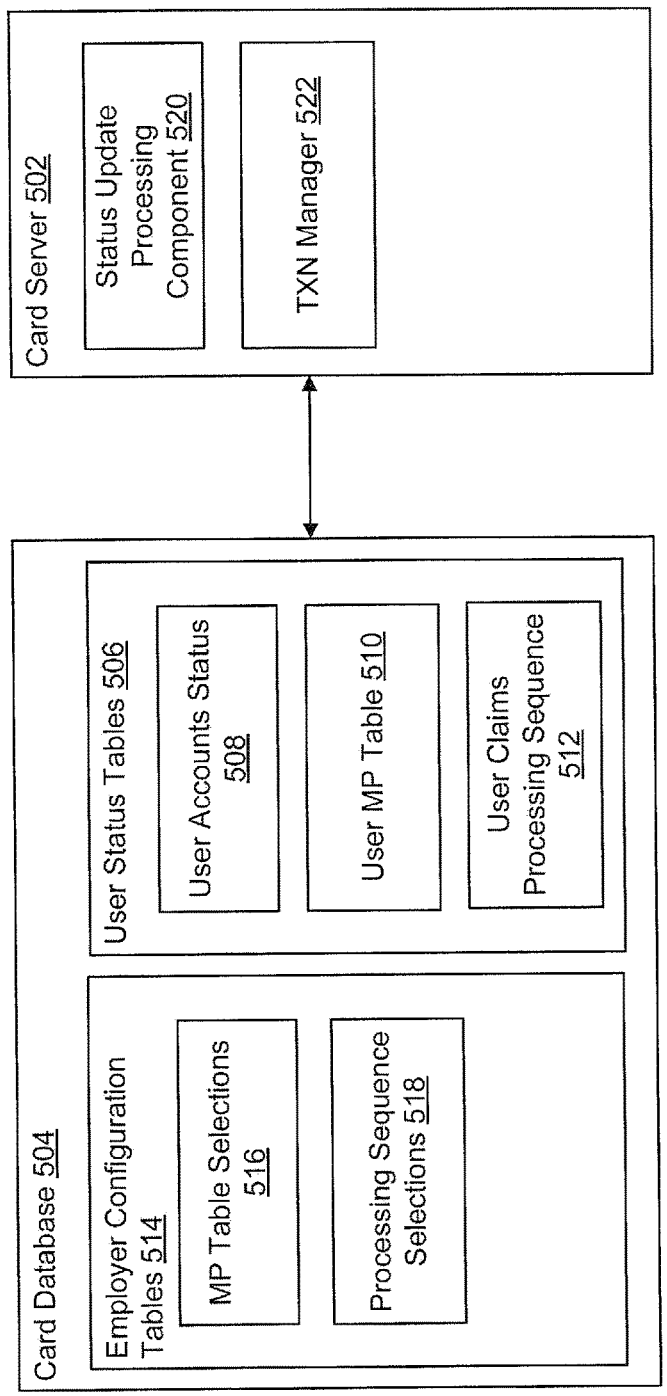
FIG. 5 is an example block diagram illustrating the components within a bank accounts system to configure and process the multiple accounts within a benefit plan at a bank, according to an example embodiment.

FIG. 5 illustrates card accounts system 500 maintained by a card vendor for managing a benefit plan containing multiple accounts and processing claim requests generated at the card vendor, according to an exemplary embodiment of card accounts system 112. Card accounts system 500 may include card server 502 and card database 504. Though depicted as a single server, card server 502 may be representative of a plurality of servers, each of which may be implemented by one or more processors. Likewise, card database 504 may be representative of a plurality of databases coupled to a plurality of card servers. Additionally, one or more of the depicted components may be implemented as processing systems comprising one or more sub-components. These sub-components may include an interface for communicating within and/or across systems and a distribution component for sending information to other components and/or across systems.

Card server 502 may be configured to include TXN manager 522 and status update processing component 520. Status update processing component 520 may be configured to communicate with status update processing component 422 in plan management system 400 in order to provide a card to the employee allowing the employee to utilize funds within the multiple accounts of his selected benefit plan to pay for eligible services.

In an embodiment, upon storing or updating employer information in employer configuration tables 414, status update processing component 422 of plan management system 400 may send updates of MP table selections 416 and processing sequence selections 418 to status update processing component 520 of card accounts systems 500. Status update processing component 520 may then store and update the corresponding MP table selections 516 and processing sequence selections 518 of employer configuration tables 514 at the card vendor.

In an embodiment, upon storing or updating employee information in user status tables 406, status update processing component 422 of plan management system 400 may send updates of user accounts status 408, user MP table 410, and user claims processing sequence 412 to card accounts systems 500. Status update processing component 520 may then store and update the corresponding user accounts status 508, user MP table 510, and user claims processing sequence 512 of user status tables 506 at the card vendor. Similarly described for claims processing at plan management system 400, the combination of user accounts status 508, user MP table 510, and user claims processing sequence 512 may be used to process claims initiated by a card and processed at card vendor system 500.

In an embodiment, exemplary user status tables 602 including user accounts status 604, user MP table 606, and user claims processing sequence 608 described with respect to plan management system 400 may be correspondingly stored in card accounts system 500. Therefore, fields of user accounts status 604 apply with respect to an employee's card. For example, the Account field is representative of CFAs associated with the card to service the employee's benefit plan. And, the start and end date fields associated with an account is representative if the first and last days that the card is usable by the employee.

However, user accounts status 508 may only contain accounts from the benefit plan that are supported by claim payment via a card. For example, an FSA may not support reimbursing claims payment via a card. Therefore, user accounts status 508 may not contain FSAO or FSAE from the exemplary user accounts status 604 at the plan manager. Relatedly, user MP table 510, such as user MP table 606, stored in card database 504, may not contain an FSA-L or FSA-G account for the same reasons.

TXN manager 522 may be configured to process transactions received from one or more of the systems or computers depicted in FIG. 1 as would be understood by one skilled in the art. In an embodiment, TXN manager 522 may be configured to receive transactions generated by plan management system 400 for claim reconciliation, as described in FIG. 4. Upon resolving the received transactions and applying associated updates to user accounts status 508 and user MP table 510, TXN manager 522 may send results of transaction processing to plan management system 400.

Figure 7:
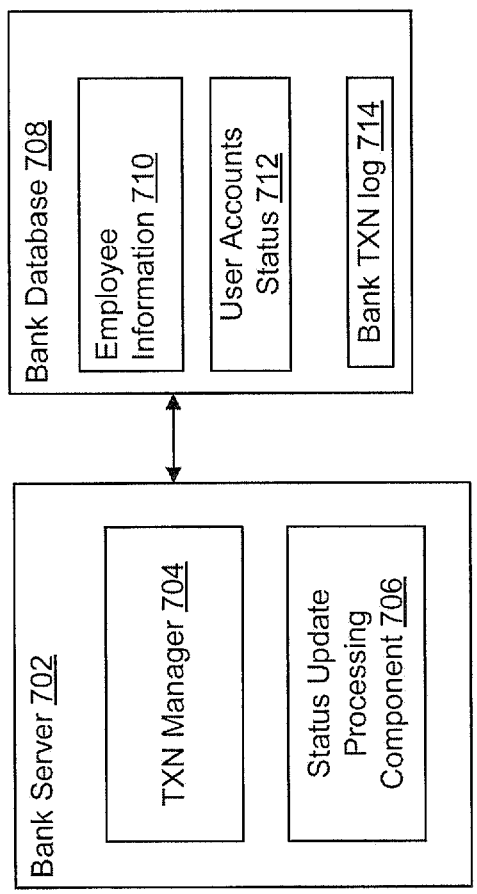
FIG. 7 is an example block diagram illustrating the components within a card accounts system to configure the multiple accounts within a benefit plan and process claims at a card vendor, according to an example embodiment.

FIG. 7 illustrates bank accounts system 700 maintained by a bank for managing accounts within a benefit plan of an employee, according to an exemplary embodiment of bank accounts system 110. Bank accounts system 700 may include bank server 702 and bank database 708. Though depicted as a single server, bank server 702 may be representative of a plurality of servers, each of which may be implemented by one or more processors. Likewise, bank database 708 may be representative of a plurality of databases coupled to a plurality of bank servers. Additionally, one or more of the depicted components may be implemented as processing systems comprising one or more sub-components. These sub-components may include an interface for communicating within and/or across systems and a distribution component for sending information to other components and/or across systems.

Bank database 708 may be configured to store employee information 710, user accounts status 712, and bank TXN log 714 via one or more database tables. Employee information 710 may include an employee's personal information and information related to setting up the employee's accounts at the bank. Similar to user account status 408 maintained at plan management system 400, the bank maintains user accounts status 712 within bank database 708. But, user accounts status 712 may not store nominal accounts such as the on-demand accounts. Additionally, whereas the accounts represented within user accounts status 712 may be associated with real banking accounts, the accounts stored and represented in user account status 408 may be proxies for the real banking accounts at the bank.

Bank database 708 may also be configured to store and maintain transaction logs within bank TXN log 714. These transactions may be received, for example, from TXN manager 413 within plan management system 400 or generated at the bank. The received transactions may then be applied to account balances and other fields within user accounts status 712.

Bank server 702 may be configured to include TXN manager 704 and status update processing component 706. Status update processing component 706 may be configured to communicate with status update processing component 422 in plan management system 400 in order to reconcile an employee's account in user accounts status 712 with a proxy account stored at plan management system 400. Such communications may include enrolling an employee into one or more accounts of the selected benefit plan.

For example, status update processing component 706 may receive a request from an employee to close one of the accounts within user accounts status 710. Accordingly, status update processing component 706 may update records stored in bank database 708, such as changing a status of the designated account to closed in user accounts status 712. Then, status processing component 706 may send the changed status to plan management system 400.

TXN manager 704 may be configured to process transactions received from one or more of the systems or computers depicted in FIG. 1 as would be understood by one skilled in the art. In an embodiment, TXN manager 704 may be configured to receive transactions generated by plan management system 400 for contribution and claim processing as described in FIG. 4 and further described in FIG. 8. Upon resolving the received transactions and applying associated updates to user accounts status 712, TXN manager 704 may send results of transaction processing to plan management system 400.

Figure 8:
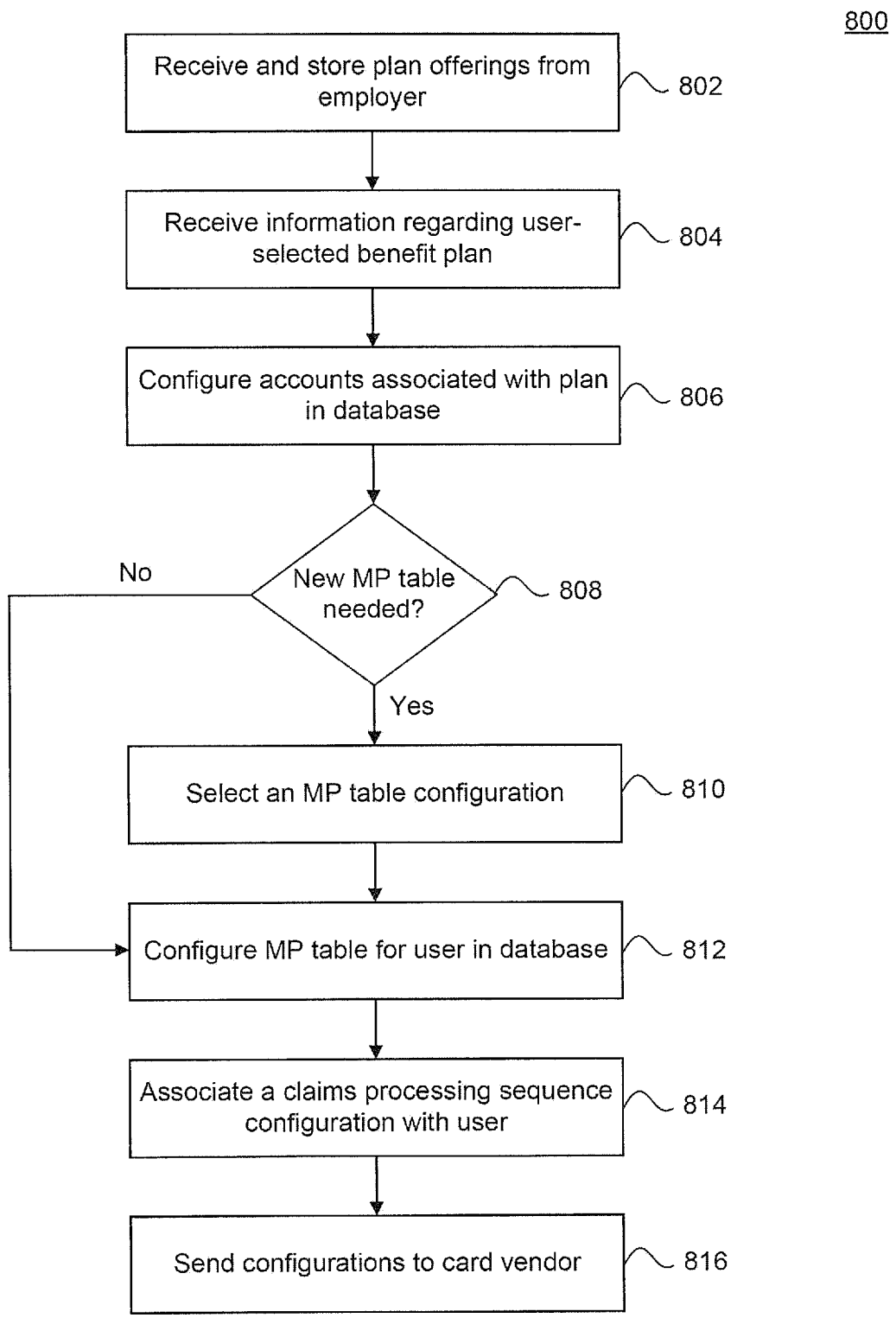
FIG. 8 is a flowchart illustrating steps for configuring a multi-purse table to provide the multiple accounts of a benefit plan, according to an example embodiment.

FIG. 8 illustrates a method 800 for configuring an MP table for an employee upon receiving the employee's information indicating an enrollment into or updates for a selected benefit plan from benefit plan offerings provided by the employer, according to an example embodiment. Method 800 may be performed across multiple systems, including employer account system 300, plan management system 400, card accounts system 500, and bank accounts system 700 as described in FIGS. 3-5 and 7. Process 800 may be performed by processing logic that may include hardware (e.g., circuitry, dedicated logic, programmable logic, microcode, etc.), software (e.g., instructions run on a processing device), or a combination thereof. In an embodiment, steps in FIG. 8 may not need to be performed in the exact order shown, as one skilled in the arts would understand. In an embodiment, method 800 may be adjusted to enable updating a pre-existing benefit plan associated with the employee to include more or fewer accounts.

In step 802, a plan management system, such as plan management system 400, receives available benefit plan offerings from an employer, such as from employer accounts system 300. The plan management system may store the benefit plan offerings and associated information and rules into an employer configurations database table of a management database, such as plan offerings 420 within employer configurations 414 of management database 404.

In step 804, the plan management system receives information regarding a benefit plan selected by an employee from the benefit plan offerings provided by his or her employer. The information may be enrollment information or updates to enrollment and stored within user enrollment tables 405. In an embodiment, the benefit plan selected by the employee may include the types of accounts, the valid start and end dates for the accounts, and the eligible services associated with the respective accounts.

In step 806, the plan management system configures and updates the accounts of the benefit plan within database tables of the management database, such as within user accounts status 408 of management database 404.

In step 808, the plan management system determines whether a new MP table needs to be configured for the employee associated with the received benefit plan. In an embodiment, if the employee is a new employee or the employee is to be newly enrolled into a benefit plan offered by the employer, method 800 proceeds to step 810. If the received benefit plan indicates updates to a pre-existing MP table configured for the employee, and the pre-existing MP table can represent the updates selected by the employee, no new MP table may be needed and method 800 proceeds to step 812. For example, the account types and associated eligible services within the pre-existing MP table may satisfy the updates and no new MP table may be needed.

In step 810, the plan management system may be configured to determine an MP table configuration from MP table configurations within MP table selections, such as MP table selections 416 stored in employer configuration tables 414, associated with the employer. The plan management system may first determine suitable MP table configurations for servicing the received benefit plan. An MP table configuration may be suitable if it has at least the account types having associated eligible services as specified within the benefit plan selected by the employee. However, the MP table configuration may include other account types not specified by the benefit plan. In other words, an MP table configuration may be suitable if the MP table configuration has account types that collectively satisfies the accounts and associated restrictions (e.g. eligible services) of the benefit plan.

In an embodiment, the plan management system may select a suitable MP table configuration based on account type inclusivity. For example, a first suitable MP table configuration may be selected for being more inclusive of account types than the second suitable MP table configuration. In other words, a more inclusive MP table configuration may service additional account types not serviceable by the less inclusive MP table configuration. By selecting the first MP table configuration to configure a first MP table for the user, possible future updates to the benefit plan offering may be more readily accommodated. As explained with regards to FIG. 4, the more inclusive suitable MP table configuration may likely need to be reconfigured via access indicators when the benefit plan of the employee changes. But due to the expanded service of account types, the plan management system may not need to re-assign an MP table configuration to the employee when the benefit plan of the employee changes.

In an embodiment, the additional account types, possible undefined account types, and the respective access indicators may enable the first MP table to represent a future selected benefit plan without needing to select a new MP table configuration and/or modifying. MP table configurations to support the future selected benefit plan.

In step 812, the plan management system configures an MP table, such as user MP table 410, for the employee within a user status table, such as user status tables 406. In an embodiment, when a new MP table was determined to be necessary in step 808, the plan management system may configure the MP table using the MP table configuration selected in step 810. In an embodiment, the plan management system may re-configure an existing MP table of the employee when a new MP table was determined to be unnecessary in step 808. During configuration, access indicators of respective account types (with associated eligible services) in the benefit plan may be enabled and access indicators of respective account types not in the benefit plan may be disabled. In an embodiment, when the updated benefit plan introduces a new account type, an available empty or placeholder account within an existing MP table may be reconfigured and enabled to support the new account type.

In step 814, the plan management system may associate a claims processing sequence with the employee when necessary. For example, in an even year, a parallel account having an odd suffix may have a higher processing priority than a parallel account having an even suffix. When the year changes, the priorities may need to be swapped and a different claims processing sequence may need to be associated with the employee to ensure claims are processed in the correct order.

In step 816, the plan management system sends the new or updated MP table configurations to the card vendor, such as card account system 700, so that the card vendor may set up a card that enables an employee to use the card to pay for eligible services. In an embodiment, the card vendor may use the received MP table configurations to process and pay for claims of an employee based on priorities, eligible service types, enabled access indicators, and claims processing sequences.

Figure 9:
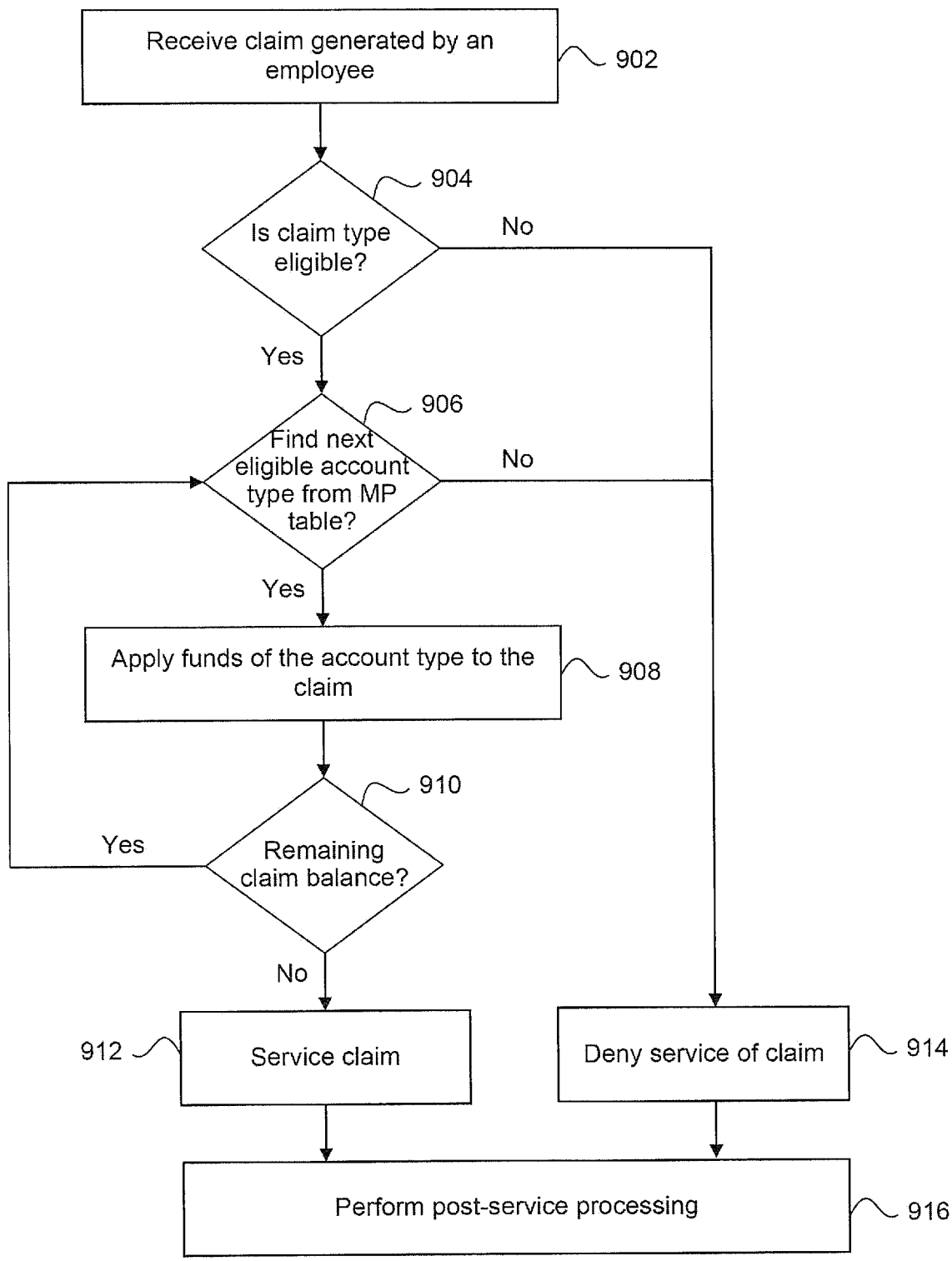
FIG. 9 is a flowchart illustrating steps for processing a claim using funds stored within respective multiple accounts of a benefit plan, according to an example embodiment.

FIG. 9 illustrates a method 900 for processing a claim using funds stored within the respective multiple accounts of a benefit plan according to the configured MP table for the employee, according to an example embodiment. Method 900 may be performed and synchronized across multiple systems, including employer account system 300, plan management system 400, card accounts system 500, and bank accounts system 700 as described in FIGS. 3-5 and 7. Method 900 may be performed by processing logic that may include hardware (e.g., circuitry, dedicated logic, programmable logic, microcode, etc.), software (e.g., instructions run on a processing device), or a combination thereof. In an embodiment, steps in FIG. 9 may not need to be performed in the exact order shown, as one skilled in the arts would understand. In an embodiment, method 900 may be adjusted to enable updating a pre-existing benefit plan associated with the employee to include more or fewer accounts.

In step 902, a plan management system, such as plan management system 400, of a plan manager receives a claim generated by an employee. The plan management system may receive the claim from the employee or a card vendor providing a card to the employee for servicing the claims. As described with regards to FIG. 2, a claim request may include a service type, a date of the service, a claim amount, and an entity providing the service.

In step 904, the plan management system determines whether the claim type is eligible for service using funds within one or more funds of a benefit plan associated with the employee. In an embodiment, the plan management system may compare an MCC of the service type of the claim with MCCs associated with an MP table representative of the employee's benefit plan to determine whether the claim type is an eligible claim type. In an embodiment, the plan management system may attempt to look up a claims processing sequence associated with the MCC code of the service type. If the claim type does not match the MCCs or the claims processing sequence is not found, method 900 proceeds to step 914. Otherwise, method 900 proceeds to step 906.

In step 906, the plan management system finds the next eligible account specified in the MP table for servicing the received claim. In an embodiment, the plan management system may iterate through the account types indicated in the MP table via respective priority values. If an account type is disabled or the respective eligible services cannot service the claim, then the plan management system may try to determine if an account having a next highest priority is an eligible account. In an embodiment, the looked-up claims processing sequence indicates the order of eligible accounts for servicing the received claim. If the plan management system cannot find an eligible account, method 900 proceeds to step 914.

In step 908, the plan management system applies funds of the selected account type to service the claim amount. In an embodiment where the account type is associated with parallel accounts as described with regards to FIGS. 4 and 6, the plan management system may use a claim processing sequence, such as user claims processing sequence 608, that is associated with the benefit plan, to determine in what order the funds within the parallel accounts should be applied. In an embodiment, steps 906 and 908 may be performed using the claims processing sequence.

In step 910, if there is a remaining claim balance because the funds from step 908 do not completely service the received claim amount, additional funds from other eligible accounts specified in the MP table may need to be withdrawn and applied. Accordingly, method 900 may proceed back to step 906. Otherwise, method 900 proceeds to step 914.

In step 912, the plan management system services the claim because funds within the accounts of the employee's benefit plan collectively covers the claim amount of the claim.

In step 914, the plan management system was not able to service the claim, so the request for payment of the claim may be denied. When a claim is denied, any funds from steps 906-910 used to service the claim amount may not be withdrawn from the respective accounts of the benefit plan.

In step 916, the plan management system performs post-service processing to ensure that the accounts maintained across the multiple entities of FIG. 1 are synchronized and up to date. Post-service processing include sending current statuses of the accounts and updated balances to, for example, the bank, the employer, or the card vendor.

Figure 10:
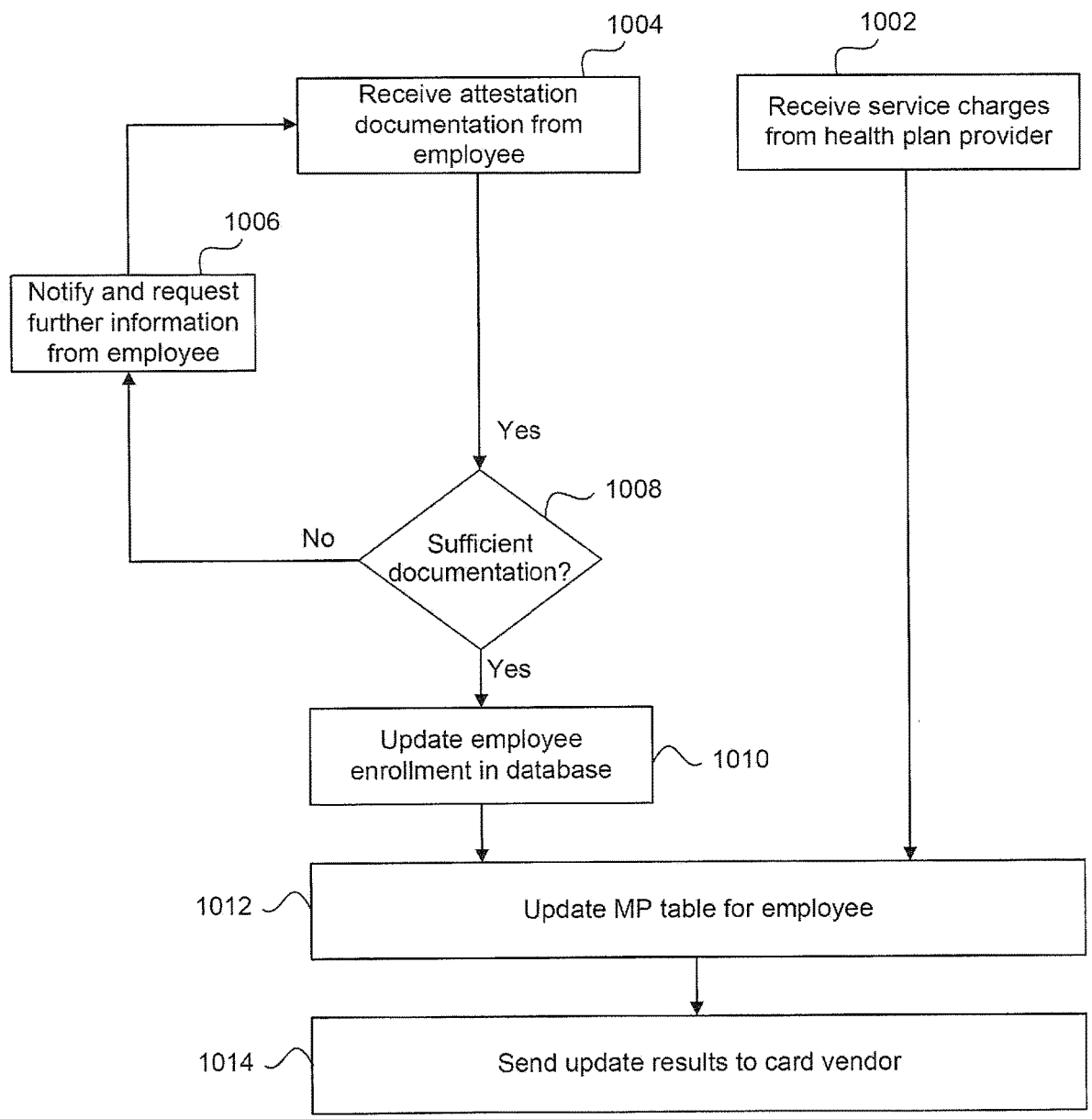
FIG. 10 is a flowchart illustrating steps for processing attestation documentation to enable support of a deductible-restricted account of a benefit plan, according to an example embodiment.

FIG. 10 illustrates a method 1000 for processing attestation documentation to enable support of a deductible-restricted account of a benefit plan, according to an example embodiment. Method 1000 may be performed and synchronized across multiple systems, including employer account system 300, plan management system 400, card accounts system 500, and bank accounts system 700 as described in FIGS. 3-5 and 7. Method 1000 may be performed by processing logic that may include hardware (e.g., circuitry, dedicated logic, programmable logic, microcode, etc.), software (e.g., instructions run on a processing device), or a combination thereof. In an embodiment, steps in FIG. 10 may not need to be performed in the exact order shown, as one skilled in the arts would understand. In an embodiment, method 1000 may be adjusted to enable updating a pre-existing benefit plan associated with the employee to include more or less accounts.

As discussed with regards to FIG. 2, a deductible-restricted account may be restricted in the types of eligible services before an associated deductible amount is met or paid. When the deductible amount is met, the deductible-restricted account may be converted to an account that supports additional eligible services. Traditionally, a plan management system, such as plan management system 400, may receive service charges from a plan provider, such as a health plan provider, associated with one or more of the deductible-restricted accounts of an employee's benefit plan. Since the service charges are received directly from the plan provider, who has verified and applied the charges, the plan management system may directly apply the service charges to reduce the deductible amount. However, not all plan providers are in direct communication with the plan management system or provide service charges to the plan management system. Moreover in traditional processes, an employee may not easily self-attest for services he or she has paid towards the deductible. Steps 1004-110 address the lack of support for self-attest processes.

In step 1002, a plan management system, such as plan management system 400, receives service charges from a plan provider. Because the service charge comes from a direct source, the plan management system may apply the service charge directly to the deductible amount and proceed to step 1012.

In step 1004, the plan management system receives attestation documentation from an employee via an employee computer, such as employee computer 104. The attestation documentation may include a service charge amount, the type of service, and proof or documentation indicating that the service charge amount has been paid.

In step 1008, the plan management system automatically determines whether complete documentation is needed to verify service charges has been received from the user. For example, the employee may not have included proof indicating that the service charge amount has been paid, or the system may determine that such proof is inadequate. When the attestation documentation is insufficient, method 1000 proceeds to step 1008.

In step 1006, the plan management system notifies and requests further information or attestation documentation from the employee.

In step 1010, the plan management system updates employee enrollment within databases at the plan management system. For example, the plan management system may log the deductible-met date when the deductible amount associated with an account of the benefit plan has been met. In an embodiment, the plan management system may process a subsequent claim with an associated service date according to whether the service date is before or after the deductible-met date.

In step 1012, the plan management system updates the MP table for the benefit plan of the employee as explained with regards to FIG. 9. For example, the limited-purpose version of the deductible-restricted account may be disabled and the general-purpose version of the deductible-restricted account may be enabled. Upon update of the MP table, the deductible-restricted account may no longer be deductible-restricted.

In step 1014, the plan management system sends update results to the card vendor providing a card to enable an employee using the card to pay for additional eligible service that were previously restricted.

Figure 12:
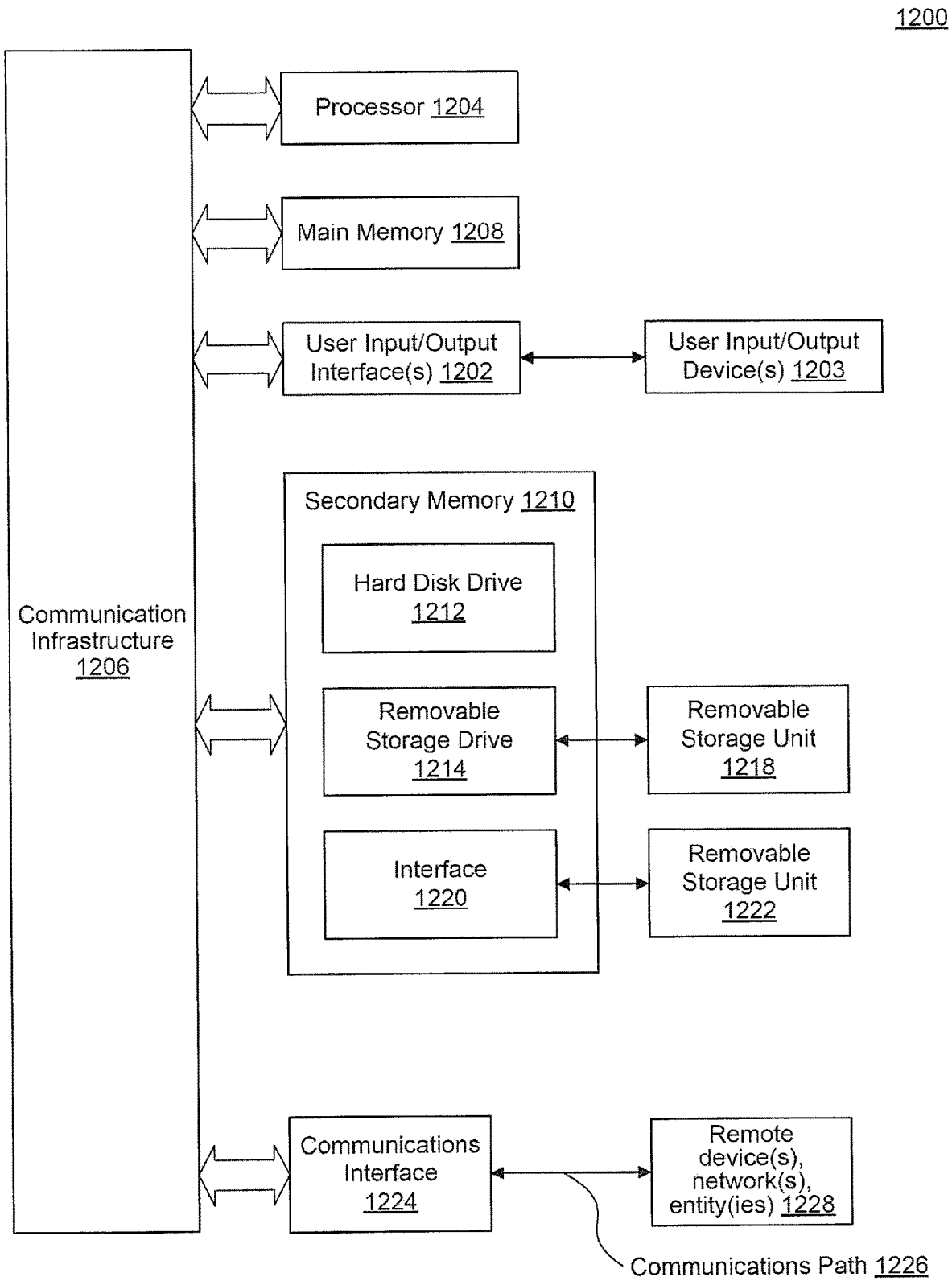
FIG. 12 is an example computer system useful for implementing various embodiments.

FIG. 12 is an example computer system that may be used to implement aspects of the systems illustrated in FIGS. 1-7, or which may be specially programmed to implement aspects of the methods illustrated in FIGS. 8-10.

Various embodiments can be implemented, for example, using one or more well-known computer systems, such as computer system 1200 shown in FIG. 12. Computer system 1200 can be any well-known computer capable of performing the functions described herein.

Computer system 1200 includes one or more processors (also called central processing units, or CPUs), such as a processor 1204. Processor 1204 is connected to a communication infrastructure or bus 1206.

One or more processors 1204 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1200 also includes user input/output device(s) 1203, such as monitors, keyboards, pointing devices, etc., that communicate with communication infrastructure 1206 through user input/output interface(s) 1202.

Computer system 1200 also includes a main or primary memory 1208, such as random access memory (RAM). Main memory 1208 may include one or more levels of cache. Main memory 1208 has stored therein control logic (i.e., computer software) and/or data.

Computer system 1200 may also include one or more secondary storage devices or memory 1210. Secondary memory 1210 may include, for example, a hard disk drive 1212 and/or a removable storage device or drive 1214. Removable storage drive 1214 may be a floppy disk drive, a magnetic tape drive, a compact disk drive, an optical storage device, tape backup device, and/or any other storage device/drive.

Removable storage drive 1214 may interact with a removable storage unit 1218. Removable storage unit 1218 includes a computer usable or readable storage device having stored thereon computer software (control logic) and/or data. Removable storage unit 1218 may be a floppy disk, magnetic tape, compact disk, DVD, optical storage disk, and/any other computer data storage device. Removable storage drive 1214 reads from and/or writes to removable storage unit 1218 in a well-known manner.

According to an exemplary embodiment, secondary memory 1210 may include other means, instrumentalities or other approaches for allowing computer programs and/or other instructions and/or data to be accessed by computer system 1200. Such means, instrumentalities or other approaches may include, for example, a removable storage unit 1222 and an interface 1220. Examples of the removable storage unit 1222 and the interface 1220 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1200 may further include a communication or network interface 1224. Communication interface 1224 enables computer system 1200 to communicate and interact with any combination of remote devices, remote networks, remote entities, etc. (individually and collectively referenced by reference number 1228). For example, communication interface 1224 may allow computer system 1200 to communicate with remote devices 1228 over communications path 1226, which may be wired and/or wireless, and which may include any combination of LANs, WANs, the Internet, etc. Control logic and/or data may be transmitted to and from computer system 1200 via communication path 1226.

In an embodiment, a tangible apparatus or article of manufacture comprising a tangible computer useable or readable medium having control logic (software) stored thereon is also referred to herein as a computer program product or program storage device. This includes, but is not limited to, computer system 1200, main memory 1208, secondary memory 1210, and removable storage units 1218 and 1222, as well as tangible articles of manufacture embodying any combination of the foregoing. Such control logic, when executed by one or more data processing devices (such as computer system 1200), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 12. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A system, comprising:
   a management database configured to store a plurality of multi-purse (MP) table configurations, each MP table configuration comprising account types, priorities, eligible service types, and access indicators, wherein the priorities specify an order among the account types to pay claims qualifying under the eligible service types; and
   at least one processor coupled to the management database and configured to:
      receive, from an employer server, a plan offering for a user in a plan management system, wherein the plan offering comprises a plurality of accounts, each account associated with the eligible service types and an account balance;
      select from the plurality of MP table configurations, an MP table configuration having a plurality of account types that collectively satisfy the plan offering, wherein the selected MP table configuration is more inclusive than a second MP table configuration in the plurality of MP table configurations;
      configure a user MP table and a processing sequence based on the selected MP table configuration;
      set an access indicator in the user MP table to identify, for each account type in the plurality of account types in the selected MP table configuration, whether the account type is enabled or disabled, wherein the access indicator is set to identify as enabled each account type needed to satisfy the plan offering; and
      send, upon configuration of the user MP table, an update of the user MP table and the processing sequence to a card vendor configured to process claims received at the card vendor based on the priorities, the processing sequence, and the eligible service types of the plurality of account types having enabled access indicators.

2. The system of claim 1, the at least one processor further configured to:
   receive a claim request for the user, the claim request comprising a claim amount and a claim service type;
   select, from the user MP table, a first account type having an enabled access indicator and having eligible service types that include the claim service type;

determine whether first funds associated with the first account type cover the claim amount; and select a second account type having the claim service type according to the priorities to cumulatively service the claim amount when the first funds do not cover the claim amount.

3. The system of claim 1, wherein the management database stores an association between the plan offering and the selected MP table configuration prior to receiving the plan offering from the employer server the at least one processor further configured to:

Select the selected MP table configuration based on the stored association.

4. The system of claim 1, wherein the selected MP table configuration further comprises an additional account type that does not satisfy any of the received plurality of accounts with the eligible service types, the at least one processor further configured to:

Disable an access indicator of the additional account type.

5. The system of claim 4, the at least one processor further configured to:

receive, from the employer server, an updated plan offering comprising an additional account that is satisfied by the additional account type; and update the user MP table by enabling the access indicator of the additional account type in response to receiving the updated plan offering.

6. The system of claim 4, wherein the additional account type is an undefined account type, the at least one processor further configured to:

receive from the employer server a new account type; and update the user MP table by changing the undefined account type to the new account type without generating a new MP table configuration.

7. The system of claim 2, wherein the first account type is a deductible-restricted account type and the second account type is a non-restricted account type, and wherein the claim request is related to an account associated with the second account type, and wherein the claim request further comprises attest documentation, the at least one processor further configured to:

verify that the attest documentation is complete and that the claim request is valid;

upon verification, apply the claim amount to a deductible associated with the first account type; and if the deductible is met, enable the non-restricted account type and disable the deductible-restricted account type by configuring the access indicators.

8. A method, comprising:

receiving, by one or more processors, from an employer server, a plan offering for a user in a plan management system, wherein the plan offering comprises a plurality of accounts, each account associated with eligible service types and an account balance, selecting, by the one or more processors, from a plurality of multi-purse (MP) table configurations, an MP table configuration having a plurality of account types that collectively satisfy the plan offering, wherein each MP table configuration in the plurality of MP table configurations comprises account types, priorities, the eligible service types, and access indicators, and wherein the selected MP table configuration is more inclusive than a second MP table configuration in the plurality of MP table configurations;

configuring, by the one or more processors, a user MP table and a processing sequence based on the selected MP table configuration, setting, by the one or more processors, an access indicator in the user MP table to identify for each account type in the selected MP table configuration whether the account type is enabled or disabled, wherein the access indicator is set to identify as enabled each account type needed to satisfy the plan offering; and sending, by the one or more processors upon configuration of the user MP table, an update of the user MP table and the processing sequence to a card vendor configured to process claims received at the card vendor based on the priorities, the processing sequence, and the eligible service types of the plurality of account types having enabled access indicators.

9. The method of claim 8, further comprising:

selecting, from the user MP table, a first account type having an enabled access indicator and eligible service types that include the claim service type;

determining whether first funds associated with the first account type cover the claim amount; and selecting a second account type having the claim service type according to the priorities to cumulatively service the claim amount when the first funds do not cover the claim amount.

10. The method of claim 8, further comprising:

Storing an association between the plan offering and the selected MP table configuration in the management database prior to receiving the plan offering from the employer server; and selecting the selected MP table configuration based on the stored association.

11. The method of claim 8, wherein the selected MP table configuration further comprises an additional account type that does not satisfy any of the received plurality of accounts with the eligible service types, further comprising:

Disabling an access indicator of the additional account type.

12. The method of claim 11, further comprising:

receiving, from the employer server, an updated plan offering comprising an additional account that is satisfied by the additional account type; and updating the user MP table by enabling the access indicator of the additional account type in response to receiving the updated plan offering.

13. The method of claim 11, wherein the additional account type is an undefined account type, further comprising:

receiving, from the employer server, a new account type; and updating the selected MP table configuration by changing the undefined account type to the new account type without generating a new MP table configuration.

14. The method of claim 9, wherein the first account type is a deductible-restricted account type and the second account type is a non-restricted account type, further comprising:

receiving, from the user, attest documentation associated with the claim request;

verifying that the attest documentation is complete and that the claim request is valid;

upon verification, applying the claim amount to a deductible associated with the first account type; and if the deductible is met, enabling the non-restricted account type and disabling the deductible-restricted account type by configuring the access indicators.

15. A non-transitory computer readable storage medium having instructions stored thereon that, in response to execution by a computing device, cause the computing device to perform operations for performing multi-account plan management, the operations comprising:

receiving from an employer server a plan offering for a user in a plan management system,
wherein the plan offering comprises a plurality of accounts, each account associated with eligible service types and an account balance, selecting from a plurality of multi-purse (MP) table configurations an MP table configuration having a plurality of account types that collectively satisfy the plan offering, wherein each MP table configuration in the plurality of MP table configurations comprises account types, priorities, the eligible service types, and access indicators, and wherein the selected MP table configuration is more inclusive than a second MP table configuration in the plurality of MP table configurations;

configuring a user MP table and a processing sequence based on the MP table configuration;

setting an access indicator in the user MP table to identify for each account type in the plurality of account types in the selected MP table configuration whether the account type is enabled or disabled, wherein the access indicator is set to identify as enabled each account type needed to satisfy the plan offering; and sending upon configuration of the user MP table, an update of the user MP table and the processing sequence to a card vendor configured to process claims received at the card vendor based on the priorities, the processing sequence, and the eligible service types of the plurality of account types having enabled access indicators.

16. The non-transitory computer readable storage medium of claim 15, the operations further comprising:

receiving a claim request for the user, the claim request comprising a claim amount and a claim service type;

selecting, from the user MP table, a first account type having an enabled access indicator and having eligible service types that include the claim service type;

determining whether first funds associated with the selected first account type cover the claim amount; and selecting a second account type having the claim service type according to the priorities to cumulatively service the claim amount when the first funds do not cover the claim amount.

17. The non-transitory computer readable storage medium of claim 15, the operations further comprising:

receiving, from the employer server, an updated plan offering comprising an additional account that is satisfied by the additional account type; and updating the user MP table by enabling the access indicator of the additional account type in response to receiving the updated plan offering.

18. The non-transitory computer readable storage medium of claim 15, the operations further comprising:

disabling an access indicator of an additional account type that does not satisfy any of the received plurality of accounts with the eligible service types.

19. The non-transitory computer readable storage medium of claim 18, wherein the additional account type is an undefined account type, the operations further comprising:

receiving a new account type; and updating the selected MP table configuration by changing the undefined account type to the new account type without generating a new MP table configuration.

20. The non-transitory computer readable storage medium of claim 16, wherein the first account type is a deductible-restricted account type and the second account type is a non-restricted account type, the operations further comprising:

receiving, from the user, attest documentation associated with the claim request;

verifying that the attest documentation is complete and that the claim request is valid;

upon verification, applying the claim amount to a deductible associated with the first account type; and if the deductible is met, enabling the non-restricted account type and disabling the deductible-restricted account type by configuring the access indicators.

* * * * *